Figures 1, 2:
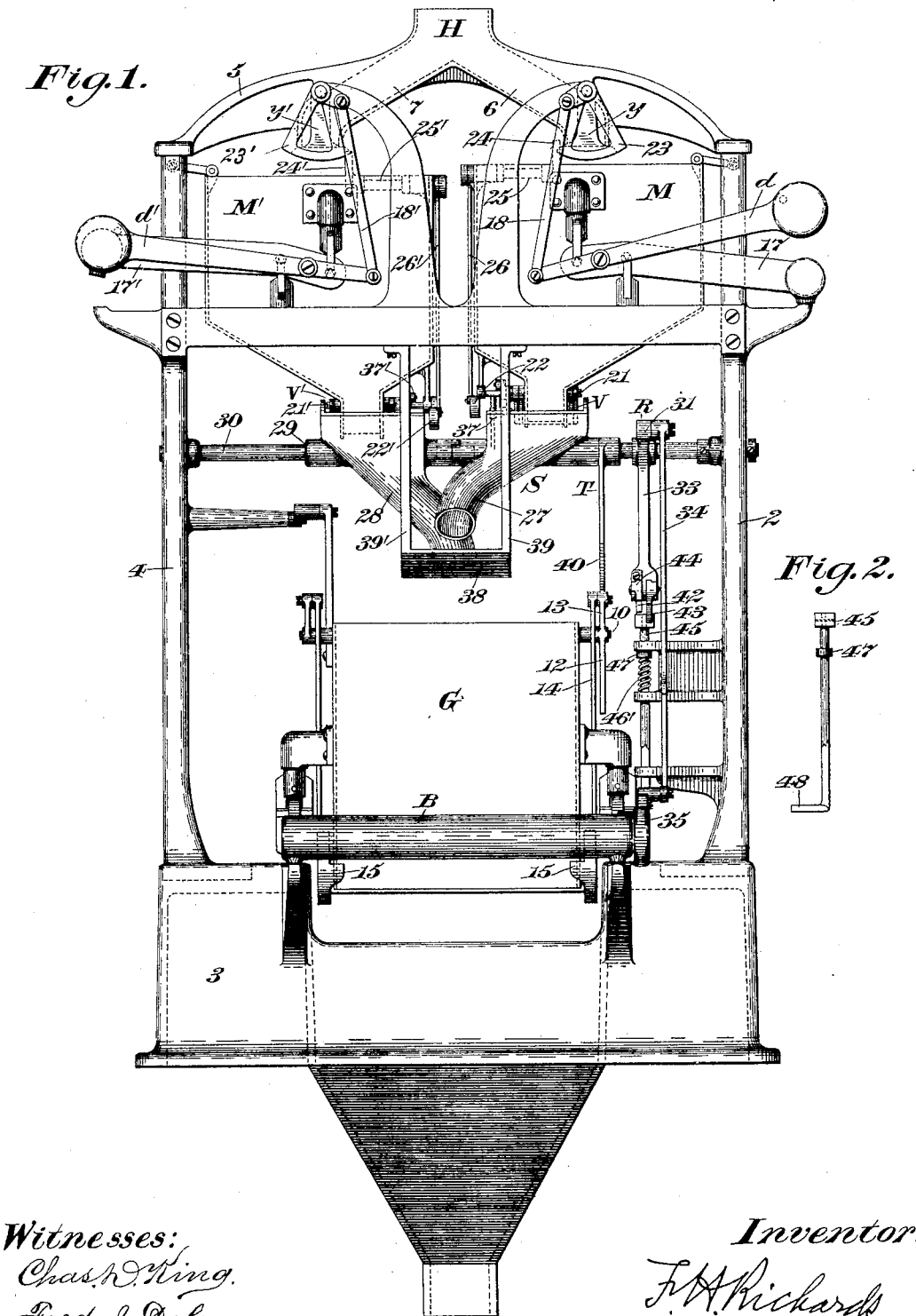

(No Model.) 3 Sheets—Sheet 1.

F. H. RICHARDS.
WEIGHING MACHINE.

No. 600,030. Patented Mar. 1, 1898.

Witnesses:
Chas. H. King.
Fred. J. Dole.

Inventor:
F. H. Richards.

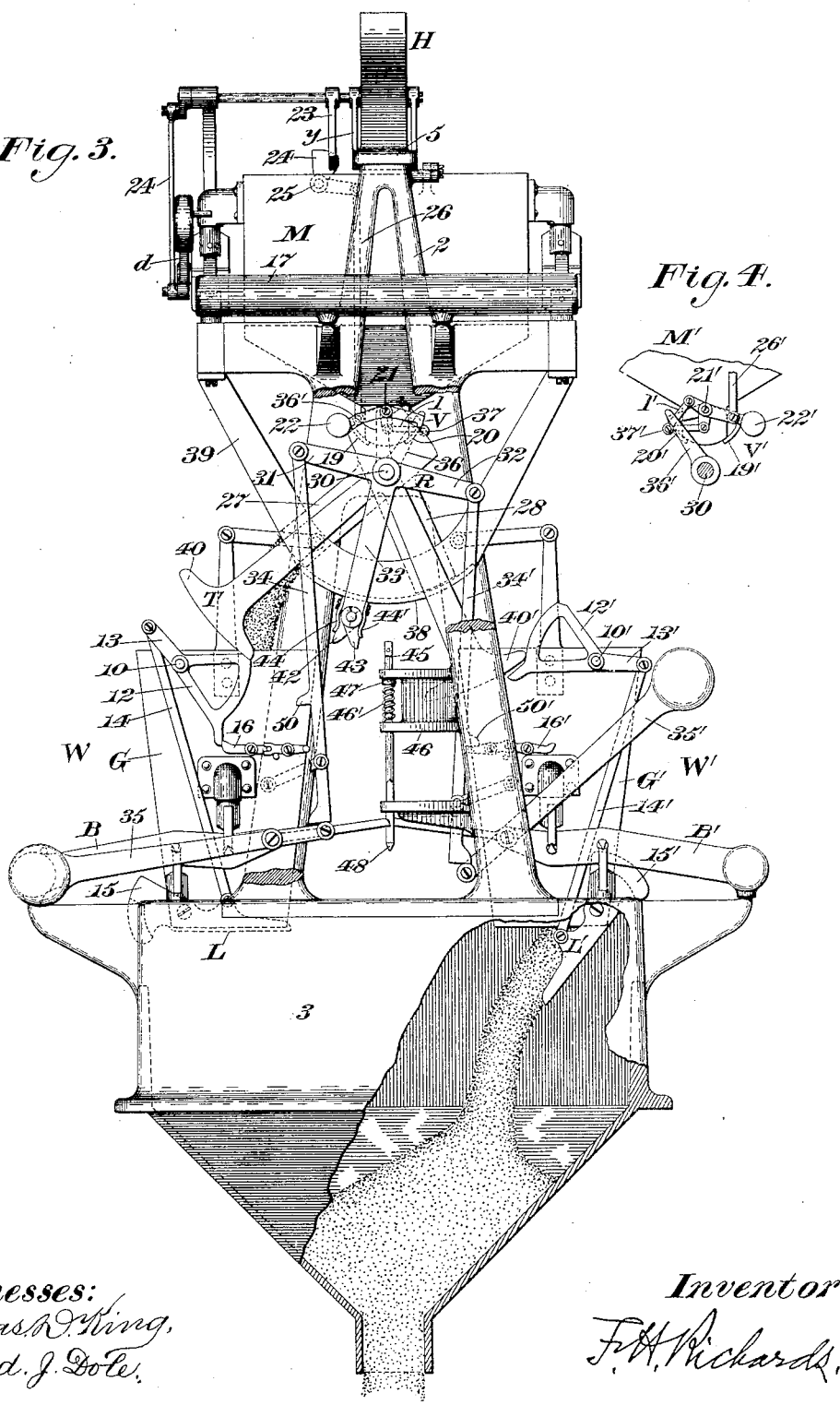

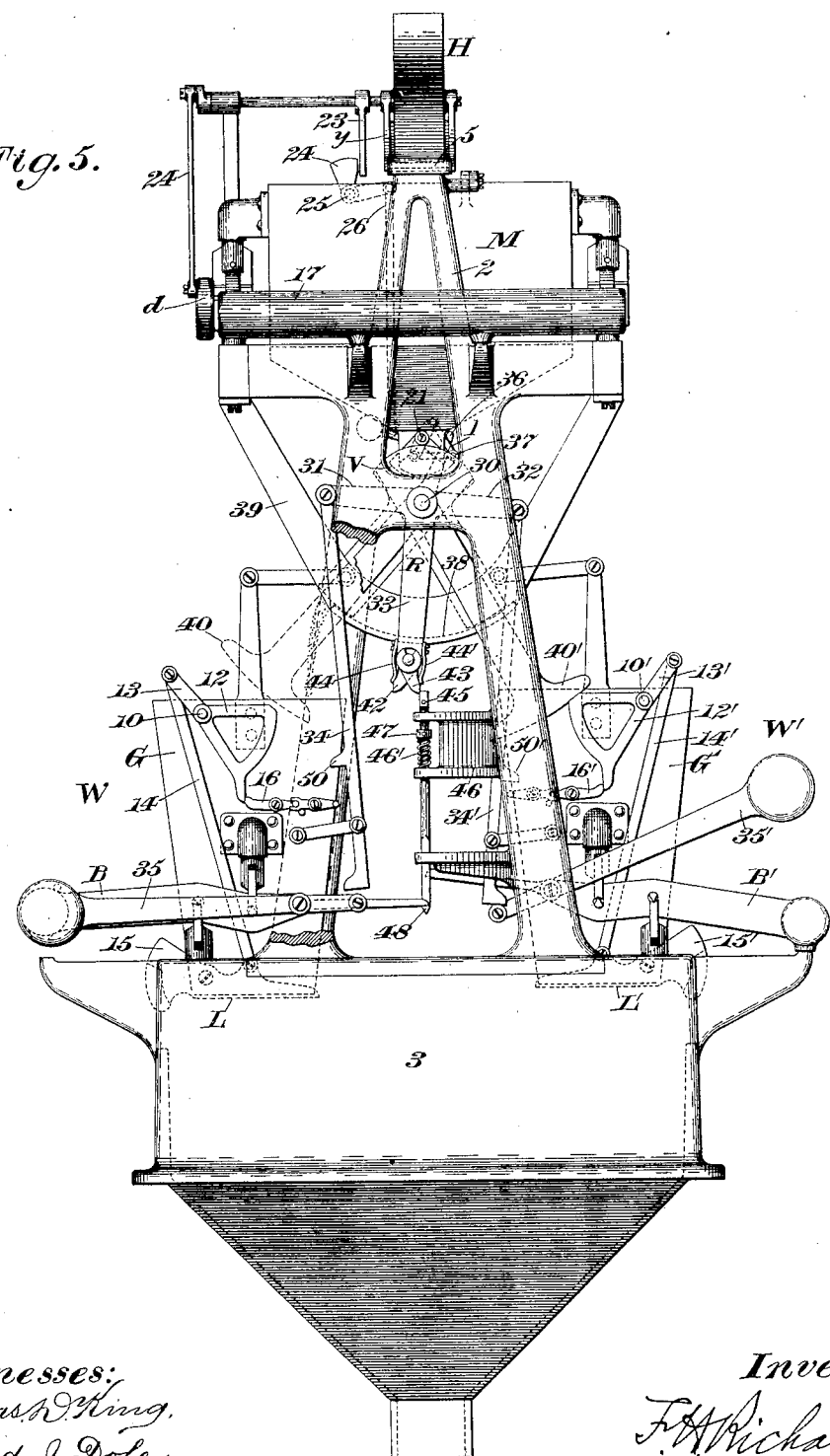

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,030, dated March 1, 1898.

Application filed August 6, 1897. Serial No. 647,302. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing apparatus for automatically weighing and delivering various classes of free-flowing materials.

One of the objects of the invention, in addition to securing great rapidity and precision, is to furnish, in connection with two independent weighing mechanisms, each including a load-receiver having a closer, two meters or rough-weighers, located above the weighing mechanisms, and a duplex stream-director actuated by the weighing mechanisms and including two stream-directing spouts unitarily shiftable upon a common axis into position for delivering streams of material from the meters or rough-weighers to the load-receivers alternately, and to also provide, in connection with said spouts, means effective on the movements of said spouts and on the descending movement of the load-receivers for gradually reducing the volume delivered from said spouts to the load-receivers.

A further object of my present invention is to furnish a multiplex weighing-machine comprehending a plurality of load-receivers, a main supply apparatus, a plurality of rough-weighers or meters located above the load-receivers, a multiplex stream-director for directing material from the rough-weighers to the receivers in alternating order and comprising a plurality of stream-directing spouts, a multiplex by-pass device in connection with the stream-director, means operative on predetermined alternating movements of the load-receivers for actuating the multiplex stream-director, and means for interrupting the movements of the multiplex by-pass at predetermined points in the alternating movements of said receivers.

In the drawings accompanying and forming part of this specification, Figure 1 is a front elevation of a multiplex weighing apparatus embodying my present improvements, said figure showing the supply-chute valves in their closed positions and one of the rough-weighers or meters in the position it occupies when discharging a load to a lower load-receiver through the medium of one of the oscillatory spouts of the multiplex stream-director. Fig. 2 is a detail drawn in projection with Fig. 1 of the shiftable by-pass stop detached. Fig. 3 is a side elevation of the weighing apparatus as seen from the right hand in Fig. 1, parts being broken away. In this figure, which shows certain elements of the machine in different positions from those illustrated in Fig. 1, the multiplex stream-director is shown with one of its spouts in a fully-open position and discharging a load into the left-hand load-receiver, whose closer is blocked against opening movement, and the right-hand load-receiver is shown with its closer open and discharging its contents, the stop member of this closer being in position for blocking the return movement of the multiplex stream-director. Fig. 4 is a side elevation of a portion of the lower end of one of the meters, showing the duplex closer in connection therewith, and also showing, partially in section, a portion of the closer-actuator, said actuator being illustrated in its closer-opening position. Fig. 5 is a side elevation similar to Fig. 3, showing the duplex stream-director with one of its spouts in position for supplying a drip-stream to the left-hand load-receiver, and also showing the duplex by-pass in engagement with the by-pass stop, which interrupts the movement thereof until the load-receiver which is being filled has arrived at a predetermined point in its descending movement. In this figure the meter-closer actuator is shown by dotted lines in a partially-retracted position, and the meter-closers are shown nearly closed.

Similar characters designate like parts in all the figures of the drawings.

The framework for supporting the various parts of the apparatus may be of any suitable character, and in the form shown comprises in part a base or bed 3, from which rise the columns or standards 2 and 4, connected at the top by the beam 5.

A duplex supply chute or hopper is illustrated at H, it being preferably formed integral with the beam 5 and having two oppositely-disposed conduits or spouts 6 and 7 for delivering material to the two rough-weighers or meters, (designated, respectively, by M and M',) which meters deliver material to the load-receivers G and G' of the two independent weighing mechanisms, which are designated by W and W' and hereinafter described, the supply from the meters to the load-receivers being controlled by a duplex stream-director (designated in a general way by S) and coöperative devices whose constructions, organizations, and operations will be hereinafter fully described.

In the form thereof illustrated in the drawings the weighing apparatus includes two independent weighing mechanisms W and W', supported on the framework side by side. These weighing mechanisms are shown in the present instance of substantially the same construction and mode of operation, and therefore it is deemed necessary to describe but one of them in detail—for example, the mechanism W—corresponding parts of the weighing mechanism W' being designated by the same characters, with additional prime-marks.

The weighing mechanisms include load-receivers or buckets G and G', respectively, and beam mechanism for sustaining the same, and said beam mechanism in the present instance consists of the counterweighted scale-beams B and B', which are fulcrumed on the framework and will be provided with suitable supports for the load-receivers.

The buckets or load-receivers G and G' will have the usual discharge-openings, which are controlled by the counterweighted closers L and L', respectively.

For maintaining the closer in its normal or closed position the following instrumentalities will be employed: A rocker or stop member 12 is fixed to a rock-shaft 10, journaled in suitable bearings at the upper end of the load-receiver or bucket G, which rocker is in the nature of a segmental plate having an integral arm 13, to the outer end of which is pivoted a connecting-rod 14, said rod being connected at its lower end to the counterweighted plate 15 of the closer L. A latch 16 is provided for engaging the rocker 12 when the closer is in its shut position and for holding said rocker against movement until the latch is tripped or thrown out of engagement with said rocker by means, hereinafter described, operated by the beam mechanism. This latch is shown pivotally mounted on the side of the load-receiver and will in practice be counterweighted to retain the same normally in its rocker-engaging position.

Located above the two weighing mechanisms W and W' are two alternately-operative meters or rough-weighers M and M', which are herein shown in the form of buckets or receptacles and are adapted for discharging their loads into the load-receivers G and G' of the weighing mechanisms W and W', the stream of material to the two load-receivers G and G' being controlled by the duplex stream-director, as will hereinafter be described. The two meters are of substantially the same construction, organization, and operation, and therefore but one of them need be specifically described, corresponding parts in the other being indicated by the same characters, with additional prime-marks.

The meter or bucket M is supported by the counterweighted scale-beam 17, which is mounted on the usual knife-edge support on the framework of the machine. Said meter has at the lower end thereof a discharge-trough, the outlet of which is controlled by a closer or closer-valve V, which, when opened, as indicated in Fig. 3, will permit the contents of the meter to pass into one member of the duplex stream-director, whence it is discharged into one of the load-receivers of the weighing mechanisms.

As a means for controlling the supply of material to the meters M and M' the supply chutes or conduits 6 and 7 are shown provided with oscillatory valves $y$ and $y'$, which may be of any suitable construction adapted for closing the outlets of said chutes, and these valves are connected by rods 18 and 18' to the inner ends of the valve actuators or levers $d$ and $d'$, pivotally supported on the beams 17 and 17' of the meter mechanism. These valves in the organization shown are opened and closed by the beams 17 and 17', in connection therewith, on the rising and falling movements of said beams, the operations being similar in a general way to the operation of the valve or stream-controller described in Letters Patent of the United States No. 548,840, heretofore granted to me.

In the preferred form thereof shown most clearly in Fig. 4 of the drawings the closer-valve V' for the meter M' comprises two curved oppositely-disposed closer-plates 19' and 20', pivotally supported at 21 on the discharge-spout of said meter, the two closer-plates being shown connected together by linkage $l'$, constructed and organized so that upon the closing or opening movement of one plate a similar movement will be imparted to the other plate. One of these plates is shown furnished with a counterweight 22', adapted for normally retaining the two closer-plates in their closed positions relatively to the discharge-spout of the meter.

For the purpose of preventing an opening movement of the closer-valve V of the meter until the supply-valve $y$ is in its closed position and for preventing a closing movement of said valve until the said closer is in its shut position I have provided, in connection with the supply-valve $y$ and the closer-valve V, reciprocally-effective interlocking instrumentalities, which in the preferred form thereof shown in the drawings comprise two coöperative stop members 23 and 24, the former of which is carried by the shaft of the supply-valve $y$ and the latter of which is fixed to the rock-shaft 25 at the upper end of the meter and is connected by a rod 26 to the counterweighted closer-valve V of the meter, the construction and organization of the coöperative stops being such as to block the movements of one another alternately.

As a means for supplying material from the meters M and M' alternately to the load-receivers G and G' and for controlling the volume I have provided in operative relation with the meters and with the load-receivers a multiplex stream-controlling director S, which in the form thereof shown most clearly in Figs. 1 and 5 of the drawings comprises two angularly-disposed stream-directing spouts 27 and 28, pivotally supported at 29 above and substantially midway between the two load-receivers G and G', with their receiving ends in operative relation with the two discharge-spouts of the meters M and M', respectively, and with their discharge ends in position for directing material to the two load-receivers G and G'. The stream-directing spouts are shown in Fig. 1 coupled together for unitary oscillatory movements, they being preferably fixed to a horizontally-disposed shaft 30, journaled in the side frames of the weighing apparatus.

As a means for actuating the multiplex stream-director I have provided a rocker or walking-beam (designated in a general way by R) comprising two arms 31 and 32. This walking-beam is fixedly connected substantially midway of its length or midway between the two arms 31 and 32 to the rock-shaft 30 and has for the purpose of interrupting the oscillatory movements thereof at predetermined points in the descending movements of the load-receivers a depending by-pass arm 33, which will be hereinafter fully described. Pivotally connected to the outer ends of the two arms 31 and 32 of the walking-beam are two depending thrust members 34 and 34', one of which bears at its lower end upon a walking-beam actuator or lever 35, pivotally connected to the scale-beam B, and the other of which bears at its lower end upon a similar actuator 35', pivotally connected to the scale-beam B', the construction and organization of the walking-beam and the actuating instrumentalities therefor being such that on the descending movement of the scale-beam B of one weighing mechanism the walking-beam, together with the multiplex stream-director, will have a movement in one direction, and on a similar movement of the beam B' of the other weighing mechanism said walking-beam and stream-director will have a movement in an opposite direction.

As a convenient means for positively actuating the closer-valves V and V' of the meters M and M', I have provided in fixed connection with the stream-director two oppositely-disposed valve-actuating arms or levers 36 and 36', respectively, which extend upward from the axis of the walking-beam in position to alternately engage projections 37 and 37' upon the linkage connection l and l' of the closer-valves V and V' and impart an opening movement to said valves alternately on opposite movements, respectively, of the stream-director, as will readily be understood by reference to Figs. 3, 4, and 5 of the drawings.

For the purpose of gradually cutting off the supply of material from each of the stream-directing spouts to the load-receiver supplied thereby on the descending movement of said receiver I have provided in operative relation with the discharge ends of these spouts a fixed cut-off plate 38, which is supported in bearings in horizontal bracket-arms 39 and 39', fixed to the framework, (see Figs. 1 and 3,) said plate being located slightly below and concentric to the path of movement of the lower discharge ends of the stream-directing spouts. This plate, which is located substantially midway between the two load-receivers, terminates at opposite ends above the receiving ends of the load-receivers and is so disposed with relation to the discharge ends of the stream-directing spouts that when one of the load-receivers is in its elevated or load-receiving position said plate will not intersect the discharge-opening of the spout which supplies such receiver and will, when the load-receiver is descending under the weight of the load and during the retractive movement of the spout, gradually intersect and reduce the effective area of said opening and finally cut off the supply of material from said spout, the closing of the discharge end of the spout being of course due to the retractive movement thereof, as will be understood by reference to the drawings.

For the purpose of blocking the opening movements of the closers L and L' of the two load-receivers alternately on the closing movements of the stream-director I have provided in fixed connection with the walking-beam and multiplex stream-director a multiplex blocking device, (designated in a general way by T,) and which in the present instance is shown as a duplex device comprising two angularly-disposed stop members 40 and 40', which depend in relatively-oblique lines and have their working faces substantially concentric to the axis of the walking-beam, its shaft 30, and the stream-director. The working faces of the two stop members of the blocking device are so disposed as to alternately engage the rockers or stop members 12 and 12', connected with the closers L and L', respectively.

The stop members 40 and 40' of the blocking device and the rockers or stops 12 and 12', in connection with the closers L and L' of the load-receivers G and G', constitute interlocking devices which are reciprocally effective for blocking the movements of one another—that is to say, when a closer, as L', (see Fig. 3,) is in its open position the stop member 12' will block the movement of the stop member 40' of the blocking device, and at the same time the stop member 40 of the blocking device will engage and prevent the closer-opening movement of the stop member 12, connected to the closer L.

For the purpose of arresting the movements of the walking-beam and connected stream-directors during the descending movements of the load-receivers G and G', I have provided, in connection with the lower end of the by-pass arm 33, two oppositely-disposed by-passes 42 and 43, which are pivotally supported at the lower end of said arm and are normally held in position for engaging a by-pass stop 45 by means of the springs 44 and 44', which by-passes are adapted for alternately engaging the upper end of said by-pass stop 45, which is shown in the nature of a bar supported for reciprocatory movement crosswise of the path of the by-passes in a plane intersecting the axis of movement of the walking-beam. This by-pass stop 45, which is reactionary in its movement, is shown supported in a bracket 46, fixed to the framework, and is normally held with its by-pass-engaging end in a position intersecting the path of movement of said by-passes by means of a spiral spring 46', surrounding said bar, and one end of said spring bears against one arm of the bracket 46, and the opposite end thereof against an abutment or collar 47, which is shown fixed to said by-pass stop and limits the reactionary movement of said stop.

As a means for retracting the by-pass stop to release the by-pass and permit a movement of the stream-directors at predetermined points in the descending movement of the load-receiver the by-pass stop is shown furnished at the lower end thereof with an outwardly-extending arm or projection 48, which is located in position to be engaged by the inner non-counterweighted ends of the beams B and B' on the descending movement of these ends of said beams, said beams engaging and retracting the by-pass stop alternately. The by-pass stop and by-passes are so disposed that the movement of the stream-directing spouts will be arrested simultaneously with the arrival of the load-receivers at their poised positions, to thereby cause the spouts to deliver a stream of relatively small volume—commonly called a "drip-stream"—to the receivers, and the projection upon the by-pass stop will be so located that the beams B and B' will retract the said by-pass stop to permit a complete closure of the discharge end of one stream-directing spout by a further retractive movement thereof, which occurs after the receiver which is being filled has passed its poising position and after the latch which controls the opening movement of the closer of said receiver has been released, the releasing of the latches from engagement with the stop members which control the opening movements of the closers being effected by latch-trippers or projections 50 and 50' upon the thrust members 34 and 34'.

The operation of the weighing apparatus which has been herein partially described will be readily understood by any one familiar with the art to which this invention appertains.

Having described my invention, I claim—

1. The combination, with two weighing mechanisms located one above the other and each including a load-receiver having a closer, of a stream-director shiftably supported intermediate the receivers; means controlled by the lower weighing mechanism for actuating the director; and means in connection with the director for actuating the closer of the upper receiver.

2. The combination, with weighing mechanism including a load-receiver and with a meter located above said receiver and having a closer or valve for controlling the supply to the load-receiver, of a stream-director supported for oscillatory movements between the meter-valve and the load-receiver; means for oscillating said director; and means carried by said director and adapted, on one movement thereof, for imparting an opening movement to the meter-valve.

3. The combination, with weighing mechanism including a load-receiver, of a superposed weighing mechanism including a load-receiver having a discharge-spout furnished with a valve or closer; a stream-director pivotally supported between the upper and lower load-receivers; means actuated by the lower weighing mechanism for oscillating the director; and means carried by said director and operative, on one movement thereof, for opening the valve of the upper receiver.

4. The combination, with weighing mechanism including a load-receiver and with a meter located above said receiver and having a valve for controlling the supply to the load-receiver, of a stream-director supported for oscillatory movement between the meter-valve and load-receiver; means for oscillating said director; means carried by said director for imparting a movement in one direction to said valve; and means in connection with said valve for imparting thereto a movement in another direction.

5. The combination, with weighing mechanism including a load-receiver, of a movable load-receiver or meter located above the weighing mechanism and having a discharge-spout; two closer-blades pivotally supported in operative relation with, and adapted for opening and closing, the discharge-spout of the meter; means including a counterweighted lever connecting the closer-blades and adapted for normally retaining said blades in their closed positions; a stream-director shiftably supported in position to direct a stream of material from the upper to the lower load-receiver; means operative with the lower weighing mechanism for controlling the action of the stream-director; and means controlled by the stream-director, on one movement thereof, for imparting an opening movement to the closer-blades of the upper receiver.

6. The combination, with a plurality of weighing mechanisms, each including a load-receiver having a closer, of stream-supplying means including a plurality of meters located above the weighing mechanisms; a plurality of stream-directors, one for each load-receiver, having a common axis of movement; and means actuated by the weighing mechanisms for shifting the stream-directors, one into a supplying, and another simultaneously into a cut-off or non-supplying, position with relation to their respective load-receivers.

7. The combination, with a plurality of weighing mechanisms each including a load-receiver, of stream-supply means including a fixed cut-off plate and two oscillatory stream-directors in operative relation therewith; and means operative with the weighing mechanisms for simultaneously shifting said directors in corresponding directions and in such manner with relation to the cut-off plate as to effect a gradual closing of the discharge end of one, and a gradual opening of the discharge end of the other, director.

8. The combination, with a plurality of weighing mechanisms each including a receiver having a closer, of stream-supply means including a plurality of meters located above the weighing mechanisms; a fixed cut-off plate located between the meters and load-receivers; a plurality of stream-directors having a common axis of movement located between the cut-off plate and meters, said directors coöperating with the cut-off plate for controlling the supply of material to the load-receiver; means operative with the weighing mechanism for simultaneously shifting said directors in corresponding directions to gradually open and gradually close, through the medium of the cut-off plate, the discharge-openings of the directors alternately.

9. The combination, with a plurality of weighing mechanisms set side by side and each including a load-receiver and with stream-supply means located above said load-receiver, of a plurality of stream-directors, one for each load-receiver, located below the stream-supplying means; and actuating mechanism connecting the stream-directors and weighing mechanisms in such manner that a descending movement of one receiver will cause its respective stream-director to gradually assume a cut-off position and will simultaneously cause another stream-director to gradually assume a supplying position with relation to another receiver.

10. The combination, with weighing mechanism including a plurality of load-receivers set side by side and with a superposed supply apparatus, of a plurality of stream-directors shiftably supported above said receivers with their axes coincident; a cut-off device located between the discharge ends of the directors and the load-receivers; and means controlled by the weighing mechanisms for oscillating the directors.

11. The combination, with a plurality of meters, of a plurality of weighing mechanisms each including a load-receiver having a closer and each receiver having a stop member pivotally supported thereon and connected with the closer thereof, of a stop-member-blocking device shiftable into positions for alternately engaging, and blocking the movements of, the stop members; and means controlled by the weighing mechanisms for actuating the blocking device.

12. The combination, with a plurality of meters, of a plurality of weighing mechanisms each including a load-receiver having a closer and each receiver having a stop member pivotally supported thereon and connected with the closer thereof, of a stop-member-blocking device comprising a plurality of fixedly-connected stops shiftable unitarily into positions for alternately blocking the movements of the stop members; and means controlled by the weighing mechanisms for actuating the blocking device.

13. The combination, with two independent weighing mechanisms each including a scale-beam and a load-receiver having a closer, of a rocker or walking-beam pivotally supported above and substantially midway between said weighing mechanisms; thrust members connecting opposite ends of the walking-beam and the two scale-beams; stop members pivotally supported on the load-receivers and connected with the closers; and a stop-member-blocking device connected with the walking-beam and embodying two stop members shiftable, on movements of the walking-beam, into positions for alternately engaging, and blocking the movements of, the closer stop members.

14. The combination, with a plurality of independent weighing mechanisms set side by side and each including a scale-beam and a load-receiver having a closer, of a rocker or walking-beam pivotally supported above said mechanism; means connecting the walking-beam with the scale-beams of the weighing mechanisms; supply apparatus located above the walking-beam; a plurality of stream-directors fixed to the walking-beam and each having its receiving end in operative relation with the supply apparatus and its discharging end in operative relation with a load-receiver; and a fixed cut-off plate in operative relation with the discharge ends of the stream-directors and adapted, on certain movements thereof, for controlling the supply of material therefrom to the load-receivers.

15. The combination, with a plurality of independent weighing mechanisms set side by side and each including a scale-beam and a load-receiver having a closer, of a rocker or walking-beam pivotally supported above said mechanisms; means connecting the walking-beam with the scale-beams of the weighing mechanisms; supply apparatus located above the walking-beam; a plurality of stream-directors fixed to the walking-beam and each having its receiver end in operative relation with the supply apparatus and its discharging end in operative relation with the load-receiver; a fixed cut-off plate in operative relation with the discharge ends of the stream-directors and adapted, on certain movements thereof, for controlling the supply of material therefrom to the load-receivers; and stop devices for controlling the sequential movements of the closers and stream-directors.

16. The combination, with two independent weighing mechanisms each including a scale-beam and a load-receiver having a closer, of a rocker or walking-beam pivotally supported above and substantially midway between said weighing mechanisms; thrust members pivotally connected at their upper ends to opposite ends of the walking-beam and supported at their lower ends upon levers carried by the two scale-beams, respectively; a by-pass arm depending from the walking-beam and having two oppositely-operative by-passes at the lower end thereof; and a by-pass stop shiftably supported in operative relation with the by-passes and embodying means whereby the same may be operated by the weighing mechanism.

17. The combination, with two independent weighing mechanisms each including a scale-beam and a load-receiver having a closer, of a rocker or walking-beam pivotally supported above and substantially midway between said weighing mechanisms; thrust members pivotally connected at their upper ends to opposite ends of the walking-beam and supported at their lower ends upon levers carried by the two scale-beams, respectively; a by-pass arm depending from the central portion of the walking-beam and having two oppositely-operative by-passes at the lower end thereof; and a reactionary by-pass stop supported with its upper end normally intersecting the path of movement of the by-passes and having projections at the lower end thereof located in the path of movement of the inner ends of the scale-beams, whereby, on the alternate movements of the scale-beams, the by-pass stop will be retracted out of the path of movement of the by-passes.

18. In a weighing-machine, the combination, with an oscillatory member, of a duplex or two-way by-pass device carried by said member; a by-pass stop shiftable in a line intersecting the axis of movement of the oscillatory member and into and out from the path of movement of the by-pass device; and means for actuating said by-pass stop.

19. The combination, with two independent weighing mechanisms each including a scale-beam and a load-receiver having a closer, of a rocker or walking-beam pivotally supported above said weighing mechanisms; two stream-directors fixed to the walking-beam and adapted for directing material to the two load-receivers; means in connection with the beam mechanism and walking-beam for controlling the operation of the stream-directors; a duplex by-pass device carried by the walking-beam; and a by-pass stop normally intersecting the path of movement of the duplex by-pass device and operable for temporarily holding the walking-beam against movement, first in one, and then in the opposite, direction.

20. In a multiplex weighing-machine including a plurality of load-receivers, a supply apparatus, in combination with a multiplex stream-director for directing material to the receivers in alternating order and comprising a plurality of spouts unitarily shiftable on a common axis; a multiplex by-pass device; means operative, on predetermined alternating movements of the load-receivers, for actuating the stream-director; and means for interrupting the movements of the multiplex by-pass at predetermined points in the alternating movements of said receivers.

21. In a multiplex weighing-machine including a plurality of load-receivers, a supply apparatus including a plurality of receptacles, in combination with a multiplex stream-director including a plurality of stream-directing spouts shiftable on a common axis to supply material to the load-receivers in alternating order; a fixed cut-off plate in operative relation with the discharge ends of the spouts and effective, on a movement of said spouts, for controlling the discharge of material; a multiplex by-pass device carried by the multiplex stream-controller; means operable at predetermined points in the movements of the load-receivers for actuating the multiplex stream-director; and means for engaging the by-pass and interrupting the movements of the stream-director at predetermined points in alternating movements of the receivers.

22. The combination, with two alternately-operable automatic weighing mechanisms set side by side and each including a load-receiver having a closer, of a duplex meter mechanism including two compartments or receptacles each having a self-shutting closer; a duplex stream-director pivotally supported between the meter and weighing mechanism and embodying two unitarily-shiftable spouts for directing material alternately to the two load-receivers; means operable by the two weighing mechanisms, alternately, for shifting the director-spouts first in one and then in an opposite direction; means for controlling the discharge of material from the spouts during the movements thereof; means carried by the duplex stream-director for imparting opening movements to the meter-chamber closers, alternately; and means in connection with the stream-director and controlled by the weighing mechanism for alternately blocking the movements of the two load-receiver closers alternately.

FRANCIS H. RICHARDS.

Witnesses:
F. N. CHASE,
FRED. J. DOLE.